United States Patent
Bohn et al.

(10) Patent No.: US 8,125,111 B2
(45) Date of Patent: Feb. 28, 2012

(54) CONNECTING SUPPORT FOR CONNECTING ELECTRIC FUNCTIONAL ELEMENTS

(75) Inventors: Roland Bohn, Buehl (DE); Mario Huesges, Buehlertal (DE); Detlef Lauk, Renchen (DE)

(73) Assignee: Robert Bosch GmbH, Stuttgart (DE)

( * ) Notice: Subject to any disclaimer, the term of this patent is extended or adjusted under 35 U.S.C. 154(b) by 145 days.

(21) Appl. No.: 12/376,306

(22) PCT Filed: Oct. 2, 2007

(86) PCT No.: PCT/EP2007/060415
§ 371 (c)(1),
(2), (4) Date: Feb. 4, 2009

(87) PCT Pub. No.: WO2008/061838
PCT Pub. Date: May 29, 2008

(65) Prior Publication Data
US 2010/0194223 A1 Aug. 5, 2010

(30) Foreign Application Priority Data
Nov. 22, 2006 (DE) .......................... 10 2006 055 013

(51) Int. Cl.
*H02K 1/11* (2006.01)
(52) U.S. Cl. ........................................................ 310/71
(58) Field of Classification Search .................... 310/71; 439/217, 221, 516
See application file for complete search history.

(56) References Cited

U.S. PATENT DOCUMENTS

| 2,922,054 | A | * | 1/1960 | Miller | 310/71 |
| 5,017,818 | A | * | 5/1991 | Dohogne | 310/71 |
| 6,858,798 | B2 | | 2/2005 | Felgueroso et al. | |
| 6,906,438 | B2 | * | 6/2005 | Ursel et al. | 310/89 |
| 7,187,095 | B2 | | 3/2007 | Kokubu et al. | |
| 7,230,362 | B2 | | 6/2007 | Benkert et al. | |
| 7,298,062 | B2 | | 11/2007 | Kokubu et al. | |
| 2004/0033724 | A1 | | 2/2004 | Felgueroso et al. | |

FOREIGN PATENT DOCUMENTS

| DE | 3805060 A1 | 8/1989 |
| EP | 1453182 A2 | 9/2004 |
| JP | 4014706 | 1/1992 |
| JP | 2006050884 | 2/2006 |
| WO | 0199259 | 6/2001 |

OTHER PUBLICATIONS

PCT/EP2007/060415 International Search Report, 2008.

\* cited by examiner

*Primary Examiner* — Dang D Le
(74) *Attorney, Agent, or Firm* — Michael Best & Friedrich LLP

(57) ABSTRACT

The invention relates to a connecting support (20) for connecting electric functional elements (46) in an auxiliary drive (2) of a vehicle. The connecting support (20) comprises at least one electrically conductive metal strip (28) for establishing an electric contact. The connecting support (20) is designed in one piece or has an upper part (22) and a lower (24) part. Both parts are detachably connected with each other. The electrically conductive metal strip (28) can be housed in a receptacle (26) of the upper and lower parts (22, 24). The connecting support (20) substantially encompasses the metal strip (28).

18 Claims, 4 Drawing Sheets

CONNECTING SUPPORT FOR CONNECTING ELECTRIC FUNCTIONAL ELEMENTS

BACKGROUND AND SUMMARY OF THE INVENTION

The invention relates to a connecting support for connecting electrical functional elements of an auxiliary drive of a vehicle, for example of a windshield wiper drive.

It is known from the prior art for a brush holder and a connecting plug which are arranged on a motor component to be connected, for example, to a control contact pick-up on a transmission housing or a transmission cover via a cable or via electrically conductive metal strips. The metal strips are in this case inserted loosely and exposed in holders, or are extrusion coated with plastic in places. However, connection via a cable has the disadvantage that the cable can easily be torn off if it is guided loosely from the pole housing to the transmission housing. In turn, the electrically conductive metal strips have the disadvantage, because they are exposed, that they can easily be damaged or become dirty.

The object of the invention is therefore to provide a connecting support in which electrically conductive metal strips can be laid easily and on the other hand are protected against dirt and damage.

The connecting support in this case has the advantage that the fact that the metal strip is suitably surrounded protects it against dirt and damage. A further advantage is that the provision of an upper part and of a lower part which are detachably connected to one another, having a receptacle for the electrically conductive metal strip, means that it can be fitted easily and is easily accessible. A further advantage is that, for example if the metal strip is damaged, there is no need to replace the entire connecting support.

In another advantageous embodiment, the connecting support is formed integrally, by extrusion coating the metal strip, for example by means of plastic. This has the advantage that the connecting support together with the metal strip can be produced particularly easily and at low cost, and the metal strip is in this case reliably protected against dirt and damage. If two or more metal strips are extrusion coated in this case, then they are in this case preferably arranged to be adequately separated from one another, so that no electrical contact can occur.

In a further advantageous embodiment, the upper part and/or the lower part of the connecting support have/has two or more receptacles, depending on the purpose. The receptacles are in this case, for example, in the form of depressions or projections, with the projections in each case being arranged on both sides of the corresponding metal strip. This allows the metal strips to be guided securely without it being possible for them to slide, resulting in an electrical contact between them and thus in a short circuit. The depressions may in this case be designed such that the metal strips can be inserted horizontally or vertically into the depressions. A vertical arrangement of the metal strips has the advantage that a large number of them can be arranged alongside one another, and the connecting support can be designed to be relatively narrow.

In a further preferred embodiment, the connecting support is detachably connected at its ends for example to a plug housing with a plug or to a control contact pick-up with a contact spring. This has the advantage that the connecting support can easily be fitted and, if required, can also easily be removed again. In one alternative embodiment, at least one end of the connecting support is firmly connected to a plug housing by means of a plug, or to a control contact pick-up with a contact spring. This likewise results in it being easy to fit the connecting support. Furthermore, the plug housing or the control contact pick-up cannot be inadvertently removed. The metal strip 28 may in this case, for example, be connected to the plug 38 or to the contact spring 34 by means of soldering or welding.

In another preferred embodiment, the connecting support can be attached to an auxiliary drive by screwing, adhesive bonding, welding and/or clipping. This makes it possible to prevent the connecting support from being loosely attached to the auxiliary drive and, for example, from being able to be torn off inadvertently.

BRIEF DESCRIPTION OF THE DRAWINGS

The embodiments of the invention will be explained in more detail in the following text with reference to the schematic figures of the drawing, in which.

Identical or similar parts are annotated with the same reference symbols in the figures.

DETAILED DESCRIPTION

Figure 1:
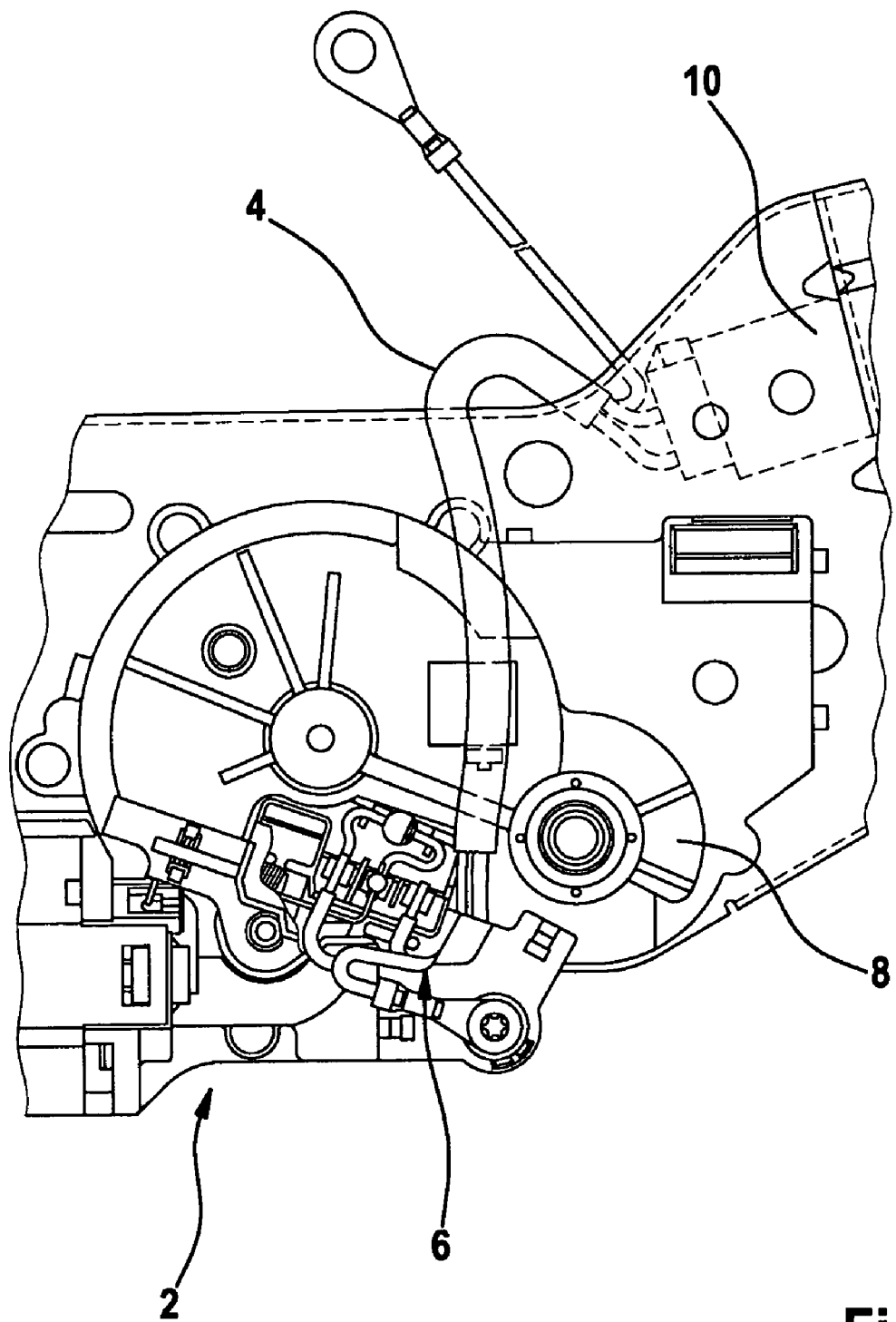
FIG. 1 shows a schematic view of a detail of an auxiliary drive according to the prior art.
Figure 2:
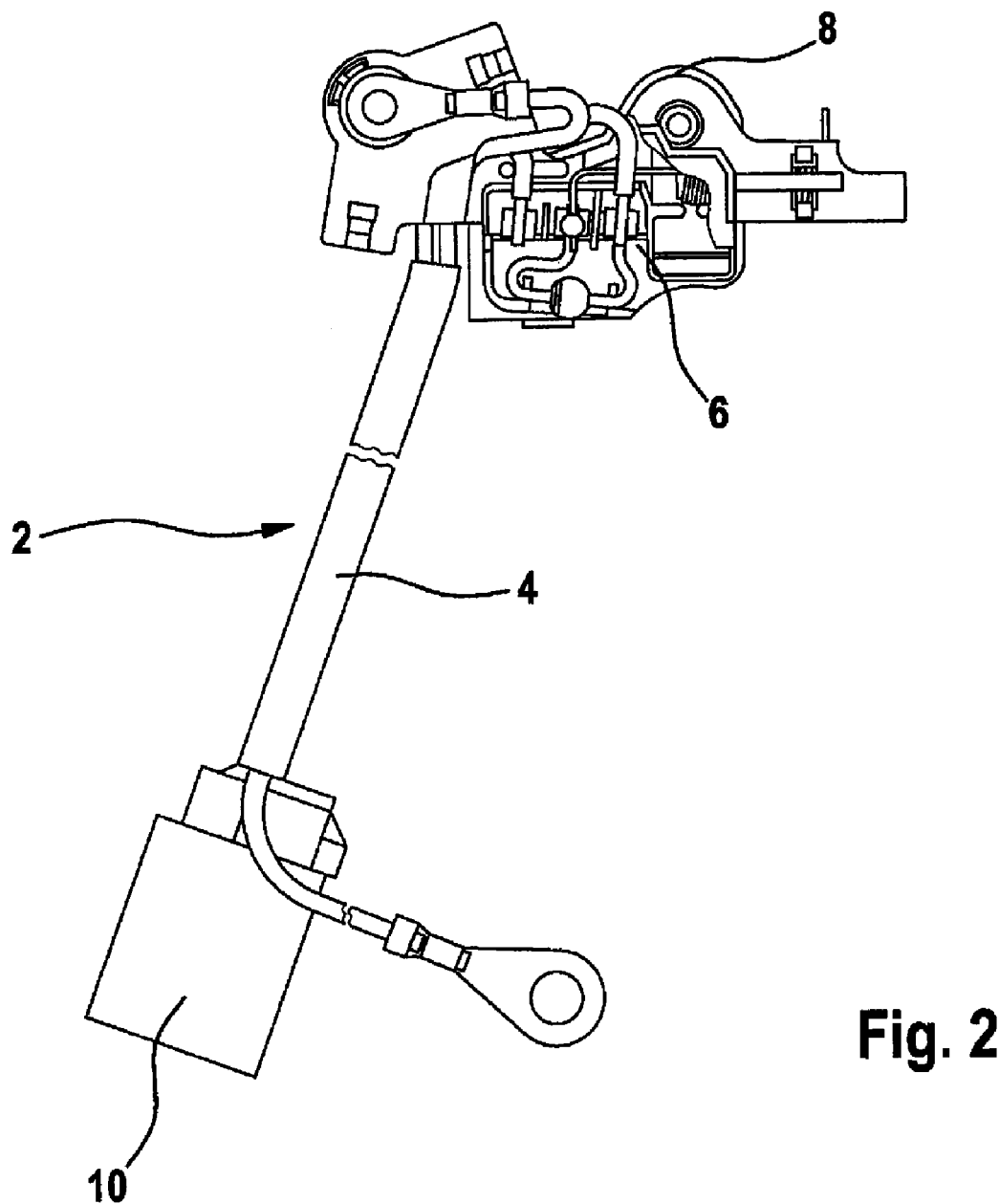
FIG. 2 shows a schematic view of a detail of a further auxiliary drive according to the prior art.

FIG. 1 and FIG. 2 each show a schematic view of a detail of an auxiliary drive 2 according to the prior art. In this case, a cable 4 is connected at one end to control contacts 6 which are arranged in a transmission housing 8, and is connected at the other end to a connecting plug 10.

Figure 3:
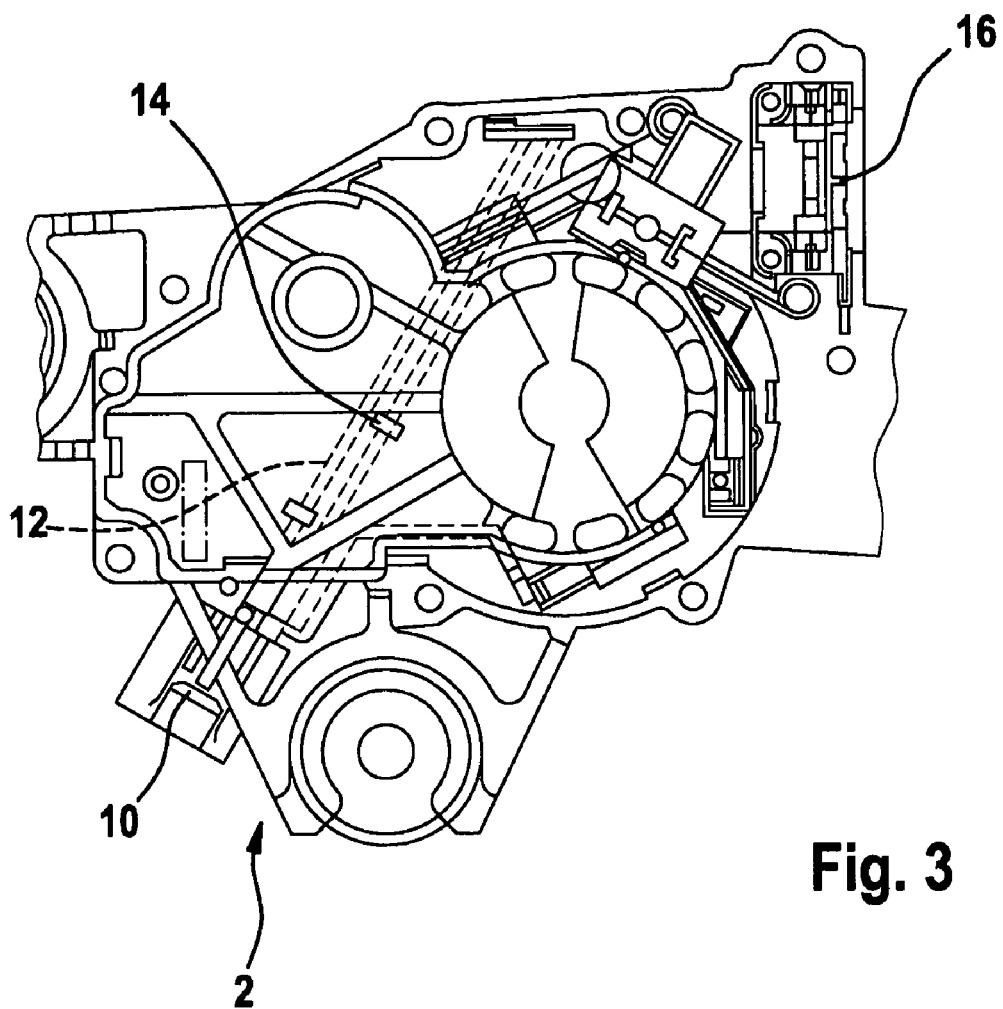
FIG. 3 shows a schematic view of a detail of a further auxiliary drive according to the prior art.

Furthermore, FIG. 3 shows a schematic view of an auxiliary drive 2 according to the prior art. In this case, electrically conductive metal strips 12 which are injection-molded or extrusion-coated in the transmission cover are used. In this case, openings 14 are provided which form support points which are necessary during injection molding or extrusion coating of the metal strips 12. The metal strips 12 in this case connect electrical components, such as a brush holder 16, to a connecting plug 10.

However, connections such as these have the disadvantage, as has already been explained above, that the individual conductors are in some cases exposed, and can therefore easily be damaged and become dirty.

Figure 4:
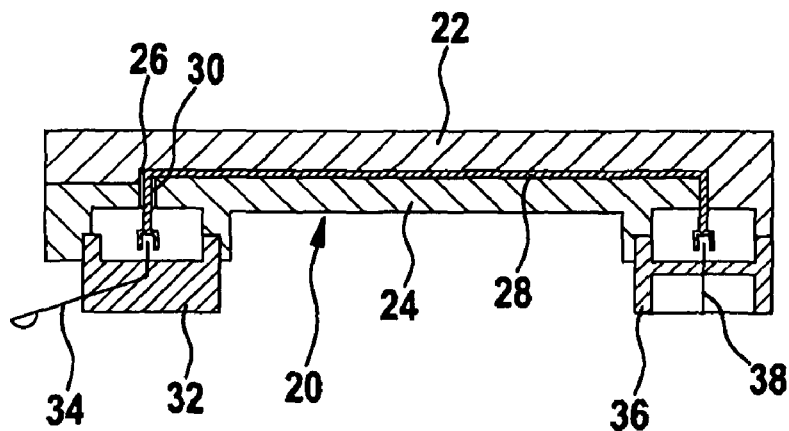
FIG. 4 shows a schematic section view of a first embodiment of a connecting support according to the invention.

In contrast, a first embodiment of the invention, as shown in FIG. 4, provides a connecting support 20 which comprises at least one upper part 22 and one lower part 24 which are detachably connected to one another. The upper part 22 and the lower part 24 form a receptacle 26 for at least one electrically conductive metal strip 28, wherein they preferably essentially completely surround the metal strip, thus protecting it against dirt and damage. The lower part 24 and the upper part 22 in this case, as a receptacle 26, form a flat surface on which the metal strip 28 is loosely arranged. Furthermore, an opening 30 is provided in the lower part 24 at one end of the connecting support 20, through which opening 30 the metal strip 28 can be passed. As is shown in FIG. 4, the lower part 24 is in this case detachably connected, for example, to a control contact pick-up 32. The control contact pick-up 32 in this case has a contact spring 34. Alternatively, instead of the control contact pick-up 32, a plug with a plug housing, for example, can also be attached to the connecting support 20. The metal strip 28 runs on the other side of the connecting support 20 between the upper part and the lower part 22, 24, wherein the upper part 22 and the lower part 24 can be connected, for example, to a plug housing 36 with a plug 38. In principle, the two ends of the connecting support 20 may also each be formed identically, that is to say, at both ends, in each case only the lower part 24, for example, is connected to a plug housing 36 or to a control contact pick-up 32. Alternatively, the upper part 22 and the lower part 24 are respectively connected to a plug housing 36 and to a control contact pick-up 32 at the two ends of the connecting support 20.

In the embodiment illustrated in FIG. 4, the connecting support 20 and its metal strip 28 are, for example, detachably connected to a plug housing 36 and its plug 38, and to a control contact pick-up 32 and its contact spring 34. Alternatively, the connecting support 20 and its metal strip 28 may also be firmly connected at least one end for example to the plug housing 36 and its plug 38 or to the control contact pick-up 32 and its contact spring 34. For this purpose, the metal strip 28 can be connected to the plug 38 or to the contact spring 34 for example by means of soldering or welding.

Figure 5:
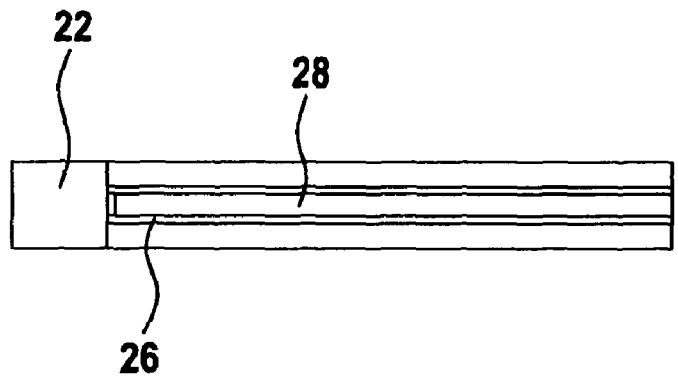
FIG. 5 shows a schematic plan view of the lower part of a second embodiment of the connecting support according to the invention with an inserted electrically conductive metal strip.

FIG. 5 shows a plan view of the lower part 24 of a second embodiment of the connecting support 20 according to the invention. The lower part 24 in this case differs from the lower part 24 shown in FIG. 4 in that it has a receptacle 26 in the form of a depression, into which a metal strip 28 is inserted. The depression is designed such that the metal strip is inserted into the depression horizontally. Alternatively, the depression may also be in the form of a slot, into which the metal strip is inserted vertically.

If the aim is to fit the connecting support 20 with a plurality of electrically conductive metal strips 28 it is possible, for example, to provide a plurality of depressions in the lower part 24 and/or upper part 22, into which the metal strips 28 are loosely inserted. In this case, the receptacles 26 in the form of depressions have the advantage over an embodiment in which the metal strips 28 are arranged separated on a flat surface that the metal strips 28 are guided securely in the depressions, and cannot slide with respect to one another. This makes it possible to reliably prevent the possibility of an electrical contact, and thus of a short circuit, occurring. However, in addition to depressions, it is also possible to provide holders, for example in the form of projections (not illustrated) on the upper part 22 and/or on the lower part 24, which are arranged on both sides of a metal strip 28, in order to guide it. In this case, the projections may be arranged continuously or on various sections of the respective metal strip 28. The above-mentioned options for attaching a metal strip 28 merely represent examples of a large number of ways in which such receptacles 26 can be designed.

The dimensions of the electrical metal strips 28, for example the strip width, may be chosen appropriately for a desired current load, wherein the metal strips 28 may also have different widths, depending on the purpose. Receptacles 26, to be precise depressions or projections in the lower part 24 and in the upper part 26, may for this purpose have dimensions which are matched to different widths of the metal strips 28, or may have a standard width.

The upper part 22 and the lower part 24 may each be in the form of a separate part, as is illustrated in FIGS. 4 and 5. In one alternative embodiment, the upper part 22 can also be connected to the lower part 24 via at least one hinge (not illustrated). This has the advantage that the upper part 22 is just folded up for insertion or replacement of a metal strip 28, and need not be removed completely, and therefore cannot be lost either. In principle, the upper part 22 may also be formed from a plurality of upper-part sections which can be removed or folded up individually.

Furthermore, the upper part 22 can be detachably attached to the lower part 24 for example by means of screwing and/or clipping and/or latching, and vice versa.

Figure 6:
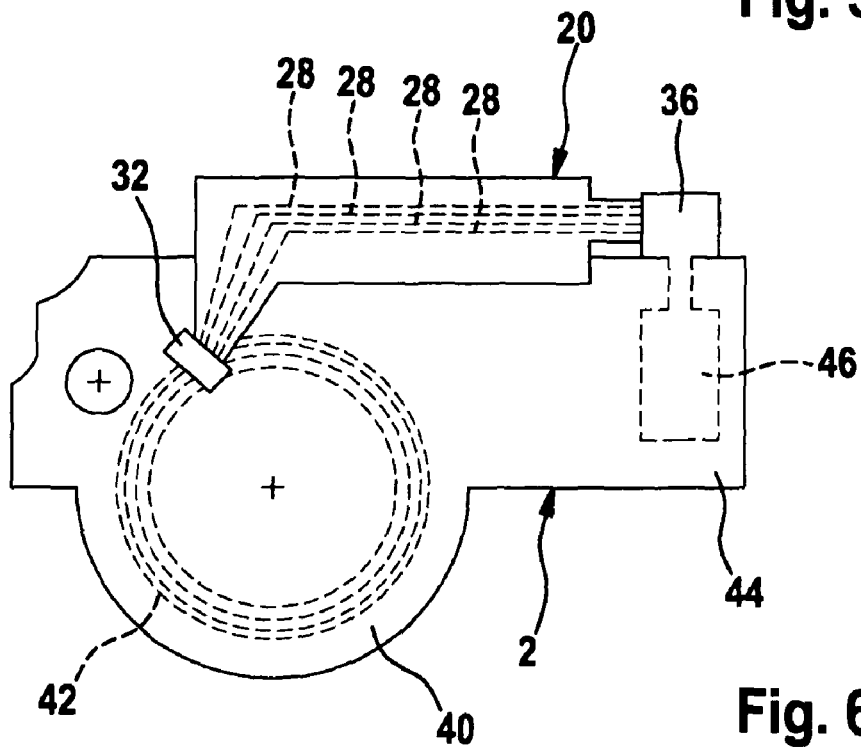
FIG. 6 shows a schematic view of an auxiliary drive which is provided with a connecting support according to the invention.

FIG. 6 shows a schematic view of an auxiliary drive 2 to which the connecting support 20 according to the invention is attached. The connecting support 20 is in this case electrically connected on one side to a control contact pick-up 32. In this case, the connecting support 20 is arranged with the control contact pick-up 32 on the transmission housing 40, preferably radially with respect to contact tracks 42 on a spur gear (not illustrated). The contact tracks 42 are in this case indicated by dashed lines. Alternatively, the connecting support 20 may also, for example, be arranged on a transmission housing cover (not illustrated) instead of being arranged on the transmission housing 40, or on some other suitable component. The connecting support 20 extends from the transmission housing 40 to the pole housing 44. In this case, at its other end, the connecting support 20 has a plug housing 36 with a plug, which are in turn electrically connected to a brush holder 46. A plurality of electrically conductive metal strips 28, which are indicated by dashed lines, are arranged in the connecting support 20.

The connecting support 20 is designed such that it electrically connects control contacts as electrical functional elements, via the control contact pick-up 32 to the plug and the brush holder 46 via the inserted metal strips 28. The connecting support 20 is designed such that it can easily be attached to parts of the auxiliary drive 2, such as the pole housing 44 and the transmission housing 40 or, for example, a transmission housing cover. The connecting support 20 may in this case, for example, be screwed, clipped or latched in, adhesively bonded and/or welded to these parts, to mention just a few of the large number of attachment options with which an average person skilled in the art will be familiar. Since the upper part 22 and the lower part 24 are detachably connected to one another, there is no need, for example, to remove the entire connecting support 20 if one metal strip 28 is damaged. For example, the lower part 24 of the connecting support 20 can thus be firmly attached to a transmission housing 40, while the upper part 22 is just clipped onto the lower part 24. In consequence, only the upper part 22 need be removed in order to gain access to the inserted metal strips 28. Furthermore, the connecting support 20 may, for example, easily be plugged onto a plug housing 36 or a control contact pick-up 32 in order in this way to connect the plug or the brush holder to control contacts. The connecting support 20 can thus be fitted easily and at low cost.

As an alternative to the embodiment described above, in which the connecting support comprises an upper part 22 and a lower part 24 which are detachably connected to one another, the connecting support may also be formed integrally. The connecting support (not illustrated) in this case preferably essentially completely surrounds one or more metal strips in order to protect them against dirt and damage. In this case, the connecting support can be produced by extrusion coating of the metal strips, for example by means of plastic. In this case, the metal strips are likewise arranged at an adequate distance from one another, as a result of which they cannot make electrical contact with one another later, in the extrusion-coated state. Furthermore, the metal strips may likewise be arranged or extrusion coated in various layers in the connecting support. This means that the metal strips may, for example, be arranged horizontally and/or vertically, or in other orientations with respect to one another, depending on the purpose. In this case, the width of the metal strips may also be varied depending on the current load. Furthermore, as in the case of the embodiment described with reference to FIG. 4, the connecting support may be connected at least one end for example to a plug housing and a plug, or to a control contact pick-up and a contact spring. In this case, these may each be firmly and/or integrally or detachably connected to the connecting support and its metal strips. In this case, the metal strip may, for example, be connected to the plug or the contact spring by means of soldering or welding. Furthermore, the connecting support may in this case be attached to an auxiliary drive (2), for example to its pole housing (44), transmission housing (40) and/or transmission housing cover, by means of screwing, adhesive bonding, welding and/or clipping. The connecting support may in this case be designed and arranged in a similar manner to the embodiment shown in FIG. 6.

The invention claimed is:

1. A connecting support (20) for connecting electrical functional elements (46) in an auxiliary drive (2) of a vehicle, wherein the connecting support (20) has at least two electrically conductive metal strips (28) for making electrical contacts, wherein the metal strips (28) are adequately separated from one another such that there is no mutual electrical contact, the electrically conductive metal strips (28) having a majority length extending along a first direction, characterized in that the connecting support (20) has an upper part (22) and a lower part (24) which are detachably connected to one another and cooperate when connected to surround at least the majority length of the electrically conductive metal strips (28) so that each of the electrically conductive metal strips (28) runs between both the upper part (22) and the lower part (24) along the majority length and is held in a receptacle (26) in at least one of the upper and lower parts (22, 24), wherein the upper part (22) and/or the lower part (24) of the connecting support (20) in this case have/has two or more receptacles (26) in order to hold the two or more metal strips (28), and wherein the metal strips (28) have different widths, corresponding to respective current loads, and the receptacles (26) are matched to the different widths.

2. The connecting support as claimed in claim 1, characterized in that the upper part (22) and the lower part (24) of the connecting support (20) can be clipped, latched or screwed to one another, and/or are connected to one another via at least one hinge.

3. The connecting support as claimed in claim 1, characterized in that each of the two or more receptacles (26) is in the form of a depression or is formed by projections, and wherein each receptacle (26) is configured to receive the corresponding metal strip (28) horizontally or vertically therein.

4. The connecting support as claimed in claim 1, characterized in that the connecting support (20) has, at least one end, a plug housing (36) with a plug (38) or has a control contact pick-up (32) with a contact spring (34) which are respectively firm or detachably connected to the connecting support (20) and to the at least two metal strips (28).

5. The connecting support as claimed in claim 1, characterized in that the connecting support (20) is configured to be attached to the auxiliary drive (2), transmission housing (40) and/or transmission housing cover, by means of screwing, adhesive bonding, welding and/or clipping.

6. The connecting support as claimed in claim 1, characterized in that the upper (22) and lower parts (24) of the connecting support (20) are composed essentially of an electrically non-conductive material.

7. An electric-motor auxiliary drive for use in vehicles, the auxiliary drive having a connecting support (20) for connecting electrical functional elements (46) in the auxiliary drive (2), wherein the connecting support (20) has at least one electrically conductive metal strip (28) for making an electrical contact, the electrically conductive metal strip (28) having a majority length extending along a first direction, and the connecting support (20) having an upper part (22) and a lower part (24) which are detachably connected to one another and cooperate when connected to surround at least the majority length of the electrically conductive metal strip (28) so that the electrically conductive metal strip (28) runs between both the upper part (22) and the lower part (24) along the majority length and is held in a receptacle (26) in at least one of the upper and lower parts (22, 24), wherein the auxiliary drive (2) is a windshield wiper drive, a window winder drive, a sliding-roof drive, a seat adjustment drive or an air-conditioning or fan drive.

8. The electric-motor auxiliary drive as claimed in claim 7, characterized in that the upper part (22) and the lower part (24) of the connecting support (20) can be clipped, latched or screwed to one another, and/or are connected to one another via at least one hinge.

9. The electric-motor auxiliary drive as claimed in claim 7, characterized in that the connecting support (20) has two or more metal strips (28), wherein the metal strips (28) are adequately separated from one another such that there is no mutual electrical contact, wherein the upper part (22) and/or the lower part (24) of the connecting support (20) in this case have/has two or more receptacles (26) in order to hold two or more metal strips (28).

10. The electric-motor auxiliary drive as claimed in claim 9, characterized in that the metal strips (28) have different widths, corresponding to respective current loads, wherein the receptacles (26) are matched to the different widths.

11. The electric-motor auxiliary drive as claimed in claim 7, characterized in that the receptacle (26) is in the form of a depression or is formed by projections, and wherein the receptacle (26) is configured to receive the metal strip (28) horizontally or vertically therein.

12. The electric-motor auxiliary drive as claimed in claim 7, characterized in that the connecting support (20) has, at least one end, a plug housing (36) with a plug (38) or has a control contact pick-up (32) with a contact spring (34) which are respectively firm or detachably connected to the connecting support (20) and to the metal strip (28).

13. The electric-motor auxiliary drive as claimed in claim 7, characterized in that the connecting support (20) is configured to be attached to the auxiliary drive (2), transmission housing (40) and/or transmission housing cover, by means of screwing, adhesive bonding, welding and/or clipping.

14. The electric-motor auxiliary drive as claimed in claim 7, characterized in that the upper (22) and lower parts (24) of the connecting support (20) are composed essentially of an electrically non-conductive material.

15. An electric-motor auxiliary drive (2) for use in vehicles, the auxiliary drive having a plug housing (36) with a plug (38), a control contact pick-up (32) with a contact spring (34), and a connecting support (20) for electrically connecting the plug (38) and the contact spring (34), wherein the connecting support (20) has at least one continuous electrically conductive metal strip (28) extending from the plug (38) to the contact spring (34), the metal strip (28) being embedded within an integral piece of electrically non-conductive material along a majority length between the plug (38) and the contact spring (34).

16. The electric-motor auxiliary drive (2) of claim 15, wherein the plug (38) is electrically coupled with a brush holder (46).

17. The electric-motor auxiliary drive (2) of claim 16, wherein the control contact pick-up (32) is positioned on a transmission housing (40) of the electric-motor auxiliary drive (2).

18. The electric-motor auxiliary drive (2) of claim 15, wherein the integral piece of electrically non-conductive material is a plastic extrusion coating.

\* \* \* \* \*